United States Patent [19]

Cuneo

[11] Patent Number: 4,530,624
[45] Date of Patent: Jul. 23, 1985

[54] DRILL PRESS WITH MEANS FOR TEMPORARILY INCREASING POWER TO THE MOTOR

[75] Inventor: Giuseppe Cuneo, Calolziocorte, Italy
[73] Assignee: Black & Decker Inc., Newark, Del.
[21] Appl. No.: 510,326
[22] Filed: Jul. 1, 1983
[30] Foreign Application Priority Data Jul. 9, 1982 [IT] Italy .............. 22371/82[U]

[51] Int. Cl.³ .............................................. B23B 49/00
[52] U.S. Cl. ........................................ 408/8; 408/6; 408/9; 318/434
[58] Field of Search ............... 408/4, 5, 6, 8, 9, 10, 408/11, 16, 135, 136, 710; 83/59, DIG. 1; 318/434, 446

[56] References Cited

U.S. PATENT DOCUMENTS

| | | | |
|---|---|---|---|
| 3,068,722 | 12/1962 | Carion | 408/136 |
| 3,475,998 | 11/1969 | Steiner et al. | 408/8 |
| 3,837,757 | 9/1974 | Levine | 408/135 |
| 4,249,117 | 2/1981 | Leukhardt et al. | 318/434 |
| 4,317,176 | 2/1982 | Saar et al. | 318/434 |

*Primary Examiner*—Gil Weidenfeld
*Assistant Examiner*—Daniel W. Howell
*Attorney, Agent, or Firm*—Ronald B. Sherer; Edward D. Murphy; Harold Weinstein

[57] ABSTRACT

A drill press having a safety device for reducing the power to the motor when a drill bit becomes stuck, and a switch for temporarily overriding the safety device, when the latter is triggered by the drill bit becoming stuck, to temporarily increase the power to the motor for freeing the stuck drill bit. The switch has an actuating member, preferably a push-button, located at the end of the control lever whereby the operator can actuate the switch without letting go of the control lever. The front of the drill press preferably has a control panel with input and operating keys.

11 Claims, 3 Drawing Figures

DRILL PRESS WITH MEANS FOR TEMPORARILY INCREASING POWER TO THE MOTOR

FIELD OF THE INVENTION

The present invention relates to drill presses, particularly drill presses having safety devices such as for protecting the motor against overload.

BACKGROUND OF THE INVENTION

Drill presses are known having a base from which extends upwardly a vertical column along which the head of the drill press is movable and can be locked in a selected position. The head houses an electric motor and appropriate transmission for rotatably driving a toolholder chuck. The chuck is movable relative to the head along an axis parallel to the column for executing drilling operations. This axial movement of the chuck is effected by a pivoted control lever operating through a rack-and-pinion mechanism.

It is known to provide such drill presses with electronic controls and digital displays, and to include a safety device for the operator in the event of a drill bit becoming locked or stuck in the workpiece, either right at the commencement of drilling or at some point during performance of the drilling operation. The safety device protects the drive motor against overload.

In the event that one or more such safety devices are triggered, there is automatically brought about a drop in the output of the motor to a safety level. After such triggering, it is up to the operator to find a way of temporarily increasing output from the motor in order to obtain release of the drill bit.

SUMMARY OF THE INVENTION

The present invention does not relate so much to the circuitry of the electronic controls and safety devices, but rather to the provision of an advantageous arrangement of various elements so as to facilitate the execution of the work and to render handling by the operator more convenient and safe.

It is an object of the invention to provide means for temporarily increasing the power to the motor to release a drill bit that has become stuck, and to enable the operator to do this without removing his hands or interrupting his visual concentration on the work.

A feature by which this is achieved is the provision of a pushbutton at the end of the control lever for operating a switch to by-pass a triggered safety device and temporarily increase the power to the motor. This has the advantage that the operator can actuate and release the switch with the hand operating the control lever, and without having to move that hand or the control lever. Therefore, according to the present invention there is provided a drill press, comprising circuitry for controlling the speed of the drive motor, this circuitry including a safety device which reduces the power to the motor when the motor stops rotating because of the drill bit becoming stuck in a workpiece, a switch for temporarily overriding the safety device, when the latter is triggered by the drill bit becoming stuck, to temporarily increase the power to the motor for freeing said stuck drill bit, and the switch having an actuating member located at the end of the control lever whereby the operator can conveniently actuate the switch without letting go of the control lever.

Preferably, a panel is arranged in the front, upper part of the head of the drill press, and in this panel are grouped together various control and input elements, including a digital display and signaling elements. The on/off switch of the drill press may be actuated by a start/stop key included in the panel.

With this arrangement of the controls, the operator is not only in a position to perform with maximum ease the input functions for the work to be performed, but also to follow at any moment the smooth progress of the work and intervene at any time, in the case of the drill bit becoming stuck, witout releasing the control lever.

Another feature of the invention is the provision of a detector for the drilling depth. The detector comprising a disk mounted on the shaft on which the control lever pivots for the lowering of the toolholder chuck, the disk being provided at its periphery with a predetermined number of radial slots. This peripheral portion of the disk passes through a free space between a photocell and light source opposite thereto. During pivoting of the control lever, and therefore of the slotted disk, the light beam emitted by the light source impinges upon the photocell when a disk slot is aligned therewith. Whereas this light beam is intercepted when a solid portion of the disk is situated between the light source and the photocell. In this way, there are created signals which identify the drilling depth, and these signals can be appropriately processed to be shown on the digital display, thereby providing the operator at any moment, with an exact indication of the drilling depth that has been attained. This can be displayed directly in millimeters.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
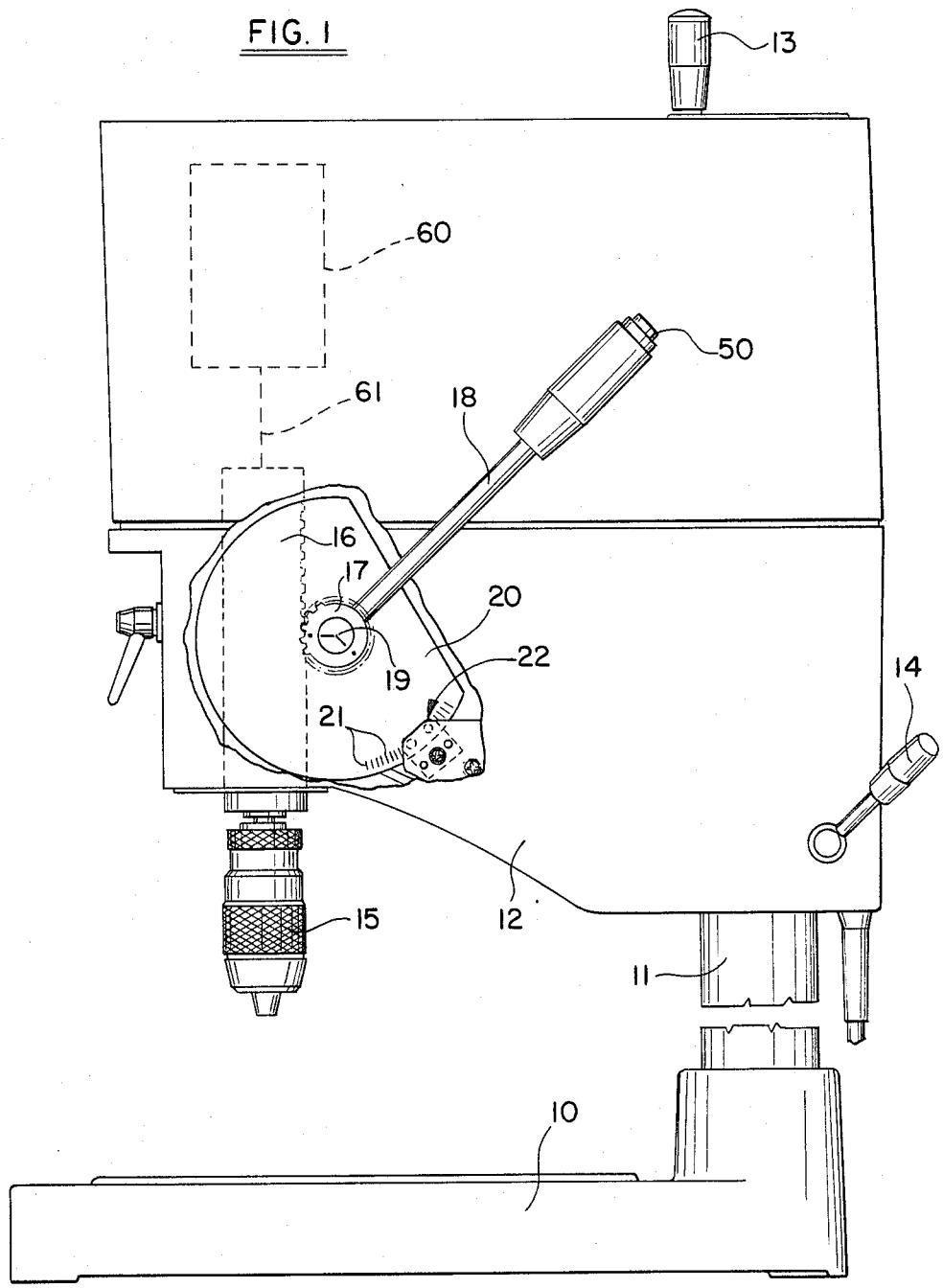
FIG. 1 is a diagrammatic side elevational view of a drill press according to the invention, with certain portions cut away.
Figure 2:
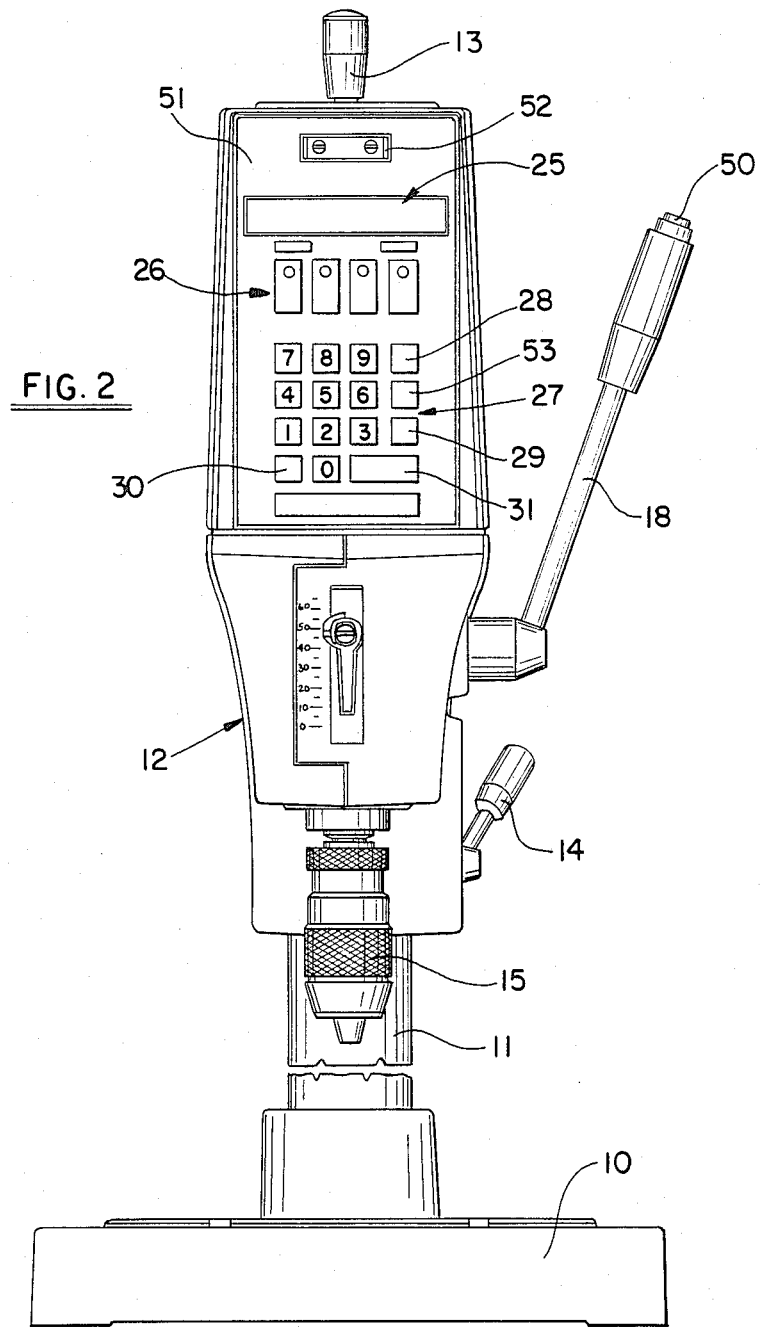
FIG. 2 shows a front elevational view of the drill press of FIG. 1.

The preferred embodiment of the drill press according to the present invention is shown in FIGS. 1 and 2, and has a base 10 from which extends upwardly a vertical column 11 which carries a head 12. The head is elevationally displaceable on the column 11 by means of a rotatable knob 13, and the head 12 is lockable in any chosen position by means of a handle 14.

Inside the head 12 is mounted an electric motor 60 (schematically shown in broken lines) together with an appropriate transmission 61 (also shown schematically by a broken line) for rotatably driving a tool-holder chuck 15. The chuck 15 is elevationally displaceable along a vertical axis relative to the head 12. A spring, not shown, maintains the chuck 15 normally in a raised position (as shown), while a control lever 18 pivoted on the head is manually actuated to lower the chuck 15 by means of a rack-and-pinion mechanism 16, 17. The chuck 15 is rotatably mounted on the rack 16, and the pinion 17 is mounted on the shaft 19 of the control lever 18.

Also mounted on the shaft 19, to rotate therewith, is a disk 20 made of plastic material and which is provided at its periphery with a certain number of radial slots 21. A detection set 22 comprising a photocell and an aligned light source are mounted in the head 12 at the appropriate position in relation to the disk 20. The light source is directed at the photocell, in a direction parallel to the axis of the shaft 19, and spaced a short distance from the photocell. The peripheral portion of the disk 20 with the radial slots 21 passes through the interspace between the photocell and the light source. By rotating the control lever counterclockwise from the rest position shown in FIG. 1, in order to lower the chuck 15, the disk 20 is also caused to rotate. This rotation of the disk 20 alternatingly brings about passing of light from the light source to the photocell and the obscuring of light from the photocell. In this way, indicator signals are created of the depth attained at any given moment by the chuck 15. These signals are used to indicate the drilling depth attained.

At the extremity of the free end of the control lever 18, there is located a push-button 50, the function of which will be described later.

As can be seen from FIG. 2, a panel, generally referred to by the reference numeral 51, is located on the front upper part of the head 12. This panel 51 groups together the various control, input and indicator elements with which the drill press is equipped. In particular, these elements comprise a master switch 52, a digital display 25, a series of pilot lights generally designated by the reference numeral 26, a keyboard 27 with ten numeral input keys (from 0 to 9), a key 28 for pre-setting the input of the desired drilling depth, a key 29 for pre-setting the input of the rotary speed of the toolholder chuck 15, a key 53 for activating safety devices, a key 30 for the cancellation of any prior input data, and a key 31 for the starting and stopping of the drill. The digital display 25 is arranged so that the input speed is indicated to the left, the input drilling depth is indicated to the right, and the drilling depth obtained at any moment is continuously indicated in the center.

It is readily apparent, that the arranging of all of these elements in a single panel 51 placed at the front, upper portion of the head 12 of the drill press, allows the operator to perform with great ease the various input and execution commands for the work to be performed, and to follow on the display 25 the smooth development of the work.

The drill press is provided with the safety devices for protection against a drill bit becoming stuck in the workpiece, and so possibly stopping rotation of the chuck 15, and for protecting the drive motor against a possible overload. When these safety devices are activated, that is made operational, by depressing the pertinent key 53, the operator is protected against possible harmful consequences of jamming of the tool bit in the workpiece, whether this occurs right at the commencement of the drilling operation, or unexpectedly during the course of drilling. Should one of the safety devices be actuated following a malfunctioning of the drill press, there results automatically a drop in the output of the drive motor to a safety level. When this occurs, it is then up to the operator to initiate action to bring about a temporary increase in the output of the motor by simply depressing the push-button 50 on the control lever 18. Depression of the push-button 50 creates a by-passing of the safety devices and temporarily increases the power to the motor while the push-button 50 is held depressed. Under normal conditions, this temporary increase in output power of the motor will be sufficient to release the drill bit. It will be appreciated that this operation can be performed without the operator having to let go of the control lever 18 itself, and therefore, under optimum conditions of ease and safety. The operator can readily depress, and when necessary thereafter release, the push-button 50 with a thumb while still grasping and fully controlling the control lever 18 with the other fingers of that hand. Positioning of the push-button 50 at the extreme end of the control lever 18, obviates the need for the operator to even move the position of the hand operating the control lever.

Figure 3:
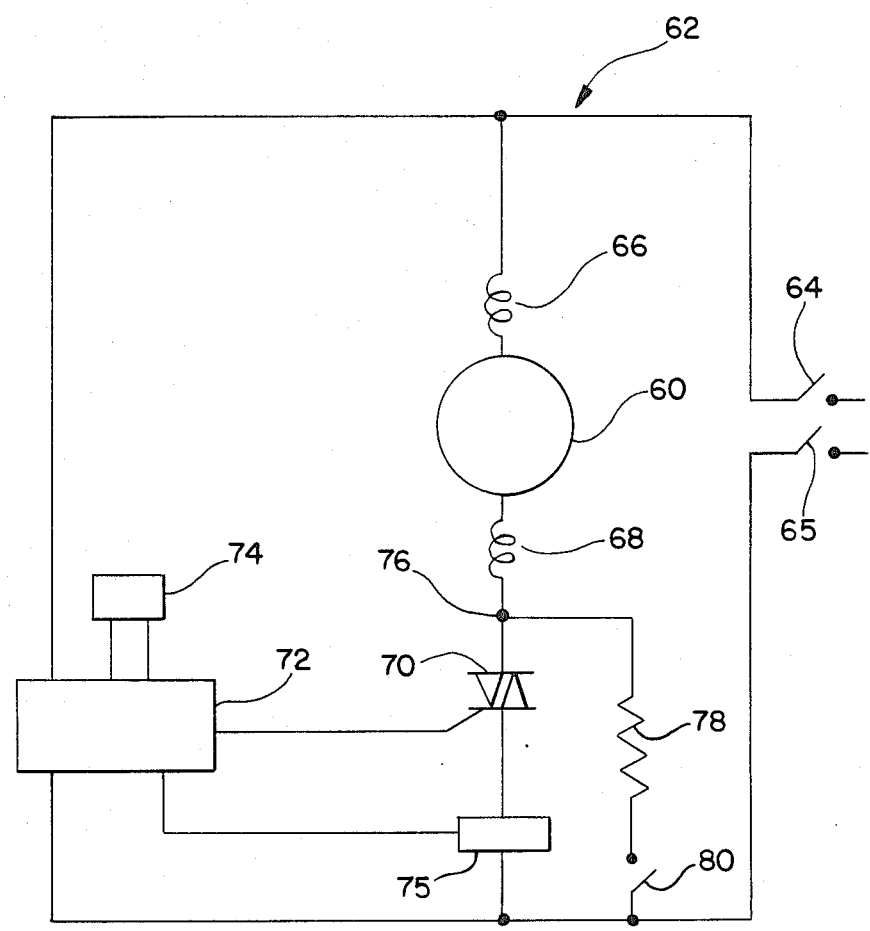
FIG. 3 is a schematic illustration of the electrical control circuitry for the drive motor of the drill press of FIGS. 1 and 2.

FIG. 3 is a schematic illustration of the electrical control circuitry 62 of the drive motor 60. Main power is supplied to the circuitry 62 through a double pole switch 64, 65 which may be operated by the master switch 52 and/or by the start/stop key 31. The electric motor 60 has field windings 66, 68, and the power available to the motor 60 is controlled by a TRIAC 70. The firing angle of the TRIAC 70 is controlled by an electronic speed control device 72, the output signal from which is also influenced by safety devices 74, 75. When the safety devices 74, 75 are brought into circuit by actuation of the key 53 in the control panel 51, the safety device 74 senses and reacts to a stoppage of the motor by the drill bit becoming stuck, and the safety device 75 senses and reacts to an overload condition of the motor 60, whether or not the motor has actually been stopped. From a node 76 between the TRIAC 70 and the field winding 68, a resistor 78 and switch 80 are arranged in series with the motor 60 and in parallel with the TRIAC 70 and safety device 75. The switch 80 is normally open, as shown, but is temporarily closed by depression of the push-button 50. Thus the depression of the push-button 50 shunts the TRIAC 70 and overload safety device 75, so that the motor 60 is provided with an immediate increase in power the size of which is determined by the resistor 78 which is in series with the switch 80.

It will be appreciated, therefore, that not only is the drill press according to the invention easy and convenient to operate, but by placing the push-button at the end of the control lever 18, the operator maintains full control of the drill press while releasing a jammed drill bit.

The above described embodiments, of course, are not to be construed as limiting the breadth of the present invention. Modifications, and other alternative constructions, will be apparent which are within the spirit and scope of the invention as defined in the appended claims.

What is claimed is:
 1. A drill press, comprising:
 a base equipped with a column extending upwardly therefrom;
 a head movably mounted on the column;
 a chuck, for holding a drill bit, rotatably mounted in said head;
 a control lever pivotally mounted on said head for moving said chuck parallel to said column;
 an electric motor mounted in said head for drivingly rotating said chuck;

start/stop means, mounted on said head, for starting and stopping said motor;

circuitry for controlling the speed of said motor;

said circuitry including a Triac in series with said motor, and a safety device which reduces the power to said motor when said motor stops rotating because of the drill bit becoming stuck in a workpiece;

a switch having an actuating member located at the end of said control lever whereby the operator can conveniently and temporarily actuate said switch without letting go of said control lever; and said switch being connected in parallel with said circuitry for temporarily shunting said Triac and overriding said safety device when the drill bit becomes stuck, whereby the power to the motor can be temporarily increased for freeing the stuck drill bit by temporarily actuating said switch.

2. The drill press of claim 1, wherein said switch actuating member is a push-button extending from the extreme end of said control lever.

3. The drill press of claim 2, wherein said head has a control panel at the front thereof facing the operator, said control panel having grouped together thereon various control and input elements, including a digital display and a key for activating said safety device.

4. The drill press of claim 3, wherein said control panel includes a start and stop key.

5. The drill press of claim 3, wherein said control lever is mounted on a shaft which carries a disk provided with a series of radial slots, the slotted portion of the disk being arranged to alternately allow and interrupt the passage of light therethrough as said disk is rotated by pivotal movement of said control lever, said disk forming part of a coder for enabling said digital display to indicate the depth of drilling attained.

6. The drill press of claim 1, further comprising a resistor in series with said switch for determining the size of increase in power to said motor while said switch is being actuated.

7. A drill press, comprising:

a base equipped with a column extending upwardly therefrom;

a head movably mounted on the column;

a chuck, for holding a drill bit, rotatably mounted in said head and movable parallel to said column relative to said head by a control lever pivotally mounted on said head and connected to said chuck by a rack-and-pinion mechanism;

an electric motor mounted in said head for drivingly rotating said chuck;

circuitry for controlling the speed of said motor, said circuitry including a safety device which reduces power to the motor when the motor stops rotating because of the drill bit becoming stuck in a workpiece;

said head having a control panel at the front thereof facing the operator, said control panel having grouped together thereon various control and input elements, including a digital display and a key for activating said safety device;

a start and stop key included in said control panel for starting and stopping said motor;

a switch having a push-button actuating member extending from the extreme end of said control lever, said switch closing when said push-button is depressed but opening upon release of said push-button, whereby the operator can conveniently manually actuate said switch with a thumb without letting go of said control lever;

said switch being connected to said motor in parallel to said speed controlling circuitry; and whereby when the drill bit becomes stuck and said safety device is triggered to reduce power to the motor, power can temporarily be increased to the motor via said switch but only while said push-button is manually depressed.

8. The drill press of claim 7, further comprising a resistor in series with said switch for determining the size of the increase in power provided to said motor while said push-button is depressed.

9. A drill press, comprising:

a base equipped with a column extending upwardly therefrom;

a head mounted on the column;

a chuck, for holding a drill bit, rotatably mounted in said head;

a control lever pivotally mounted on said head for moving said chuck via a rack-and-pinion mechanism parallel to said column;

an electric motor mounted in said head for drivingly rotating said chuck;

a Triac in series with said motor for controlling the power thereto;

an electronic speed control device having an output signal which controls the firing angle of said Triac;

a safety device which influences said output signal to reduce power to the motor when the motor stops rotating due to the drill bit becoming stuck in a workpiece;

start/stop means on said head for starting and stopping said motor;

a switch which is normally open and has a push-button actuating member extending from the extreme end of said control lever, said switch closing when said push-button is depressed but opening upon release of said push-button, whereby the operator can conveniently manually actuate said switch with a thumb without letting go of said control lever;

said switch being connected in series with said motor and in parallel with said Triac; and a resistor connected in series with said switch;

whereby when the drill bit becomes stuck and said safety device is triggered to reduce power to the motor, temporary depression of said push-button shunts said Triac to provide said motor with an immediate increase in power the size of which is determined by said resistor.

10. The drill press of claim 9, further comprising a control panel on said head, said control panel having grouped together thereon various control and input elements including a digital display and a key for activating said safety device, and said start/stop means comprises a key on said control panel.

11. The drill press of claim 9, further comprising another safety device which is arranged in parallel with said switch and said resistor, and senses and reacts to an overload condition of the motor to influence said output signal, whether or not the motor has actually been stopped by the drill bit becoming stuck.

* * * * *